United States Patent [19]

Murata et al.

[11] Patent Number: 4,923,168

[45] Date of Patent: May 8, 1990

[54] SPOOL TYPE SWITCHING VALVE DEVICE

[75] Inventors: Minoru Murata, Tokyo; Kazumasa Yamada, Chiba, both of Japan

[73] Assignee: 501 Yamada Yuki Seizo Co., Ltd., Tokyo, Japan

[21] Appl. No.: 309,667

[22] PCT Filed: Jun. 14, 1988

[86] PCT No.: PCT/JP88/00573

§ 371 Date: Jan. 31, 1989

§ 102(e) Date: Jan. 31, 1989

[87] PCT Pub. No.: WO88/10389

PCT Pub. Date: Dec. 29, 1988

[30] Foreign Application Priority Data

Jun. 15, 1987 [JP] Japan .............................. 62-148257

[51] Int. Cl.[5] .............................................. F16K 31/56

[52] U.S. Cl. ........................................ 251/75; 91/346; 137/625.66

[58] Field of Search ..................... 91/346; 137/625.66; 251/75

[56] References Cited

U.S. PATENT DOCUMENTS 4,540,349 9/1985 Du .................................. 91/346 X

FOREIGN PATENT DOCUMENTS 52-038723 3/1977 Japan .

56-000037 6/1981 Japan .

OTHER PUBLICATIONS

German Abstract Corresponding to: 52-038723 of Japan Above.

*Primary Examiner*—Gerald A. Michalsky

*Attorney, Agent, or Firm*—Thomas R. Morrison

[57] ABSTRACT

A spool type switching valve to be used for the switching operation of a diaphragm pump or a similar device, which simultaneously insures both preventing abrasion of the detent mechanism and obtaining thorough operation of switching the spool. A spool is movably fitted inside a sleeve and is prevented from standing still at a neutral point by a detent mechanism provided at one of its ends. The detent mechanism comprises a spool operator fitted around a shaft section at one end of the spool as one body, a spring holder at the end of the sleeve retains a pair of C-shaped wire springs of a circular cross-section fitted between the spool operator and the spring holder. As the spool passes the neutral point, spring forces snap the spool to the extremity of its range, thereby preventing stopping of the spool in the neutral position. An axial clearance permits the spool operator to begin moving before the spool moves.

4 Claims, 3 Drawing Sheets

57

58

60

53

31

57
58
64
31

58
60
57
31

61
58
60
62
53
63
54
55
57
31

58
60
53
57
31

SPOOL TYPE SWITCHING VALVE DEVICE

TECHNICAL FIELD

The present invention relates to a spool type switching valve device to be used for switching operation of a diaphragm pump or similar apparatus.

BACKGROUND ART

An example of conventional switching devices for diaphragm pumps is described in Japanese Utility Model Publication No. 35748/1986 which calls for providing a detent mechanism at the end of a spool used for switching the operations of a diaphragm pump in order to prevent the spool from standing still at the neutral point.

Such a conventional detent mechanism calls for convexes around the shaft at the end of the spool and propelling balls by spring pressure to the surface of the shaft at the end of the spool by means of compressed coil springs. And when the spool moves in an axial direction, the spring pressure in the direction of the radius of each ball works upon the slope of each of said convex, pushing the spool shaft towards one end of the shaft with the neutral point at the center so that the spool does not stop at the neutral point.

As the detent mechanism of a conventional device comprises convexes and compresses coils springs, when the pressure of the compressed coil springs is strong, frictional resistance between the convexes and the balls becomes strong, causing abrasion. As a result, problems lowering durability are evident. When such abrasion appears, there will be further problems in that the spool, which is fitted inside the sleeve so as to be able to rotate, becomes unable to rotate so that the abrasion continues at the convexes over only a limited portion of the balls.

On the other hand, if the pushing pressure of the coil springs is weak, the force from the balls upon the convexes becomes insufficient and thus, the switching operation of the spool becomes unreliable.

The objective of the present invention is to ensure both prevention of the detent mechanism's abrasion and the thorough switching operation of the spool.

DISCLOSURE OF INVENTION

The present invention relates to a spool type switching valve device having spool 31 fitted inside sleeve 46 so as to be able to move in the axial direction; and detent mechanism 51 provided at one end of said spool 31 in order to prevent spool 31 from standing still at the neutral point, wherein said detent mechanism comprises spool operator 57 fitted around shaft 55 incorporated at the end of spool 31 as one body; spring holder 53 provided at the end of sleeve 46 as one body; and C-shaped wire springs 58 with a circular cross section fitting between said spring holder 53. As spool 31 is moved and approaches the neutral point, wire springs 58 are rotated, with each side held by spring holder 53 as the respective center, and compressed between the spring holder and spool operator 57. When spool 31 has passed the neutral point, the repellent force stored in wire springs 58 is immediately released so that spool 31 is instantaneously switched by a snap action of wire springs 58.

The advantage of the present invention is that, as C-shaped wire springs with a circular cross section are used for the detent mechanism to apply a snap action directly to the spool operator, unlike conventional detent mechanisms using balls, it is free from the problem of wear due to abrasion and thus has better durability. The present invention has the further benefit of a smooth switching of the spool due to the rotating of the wire springs so the sufficient force in the axial direction is ensured and thus switching of the spool is done smoothly.

Further, according to the present invention, the spool operator of said refined spool type switching valve device is fitted around the shaft of the device with short clearances within which the spool operator is able to move in the direction of the shaft. As clearances 63 and 64 are thus provided, the movement of spool operator 57 is light so that wire springs 58 do not have to be strong, and that the air pressure required for switching operation of spool 31 may be made lower.

DETAILED DESCRIPTION OF THE PREFERRED EMBODIMENT

Figure 1:
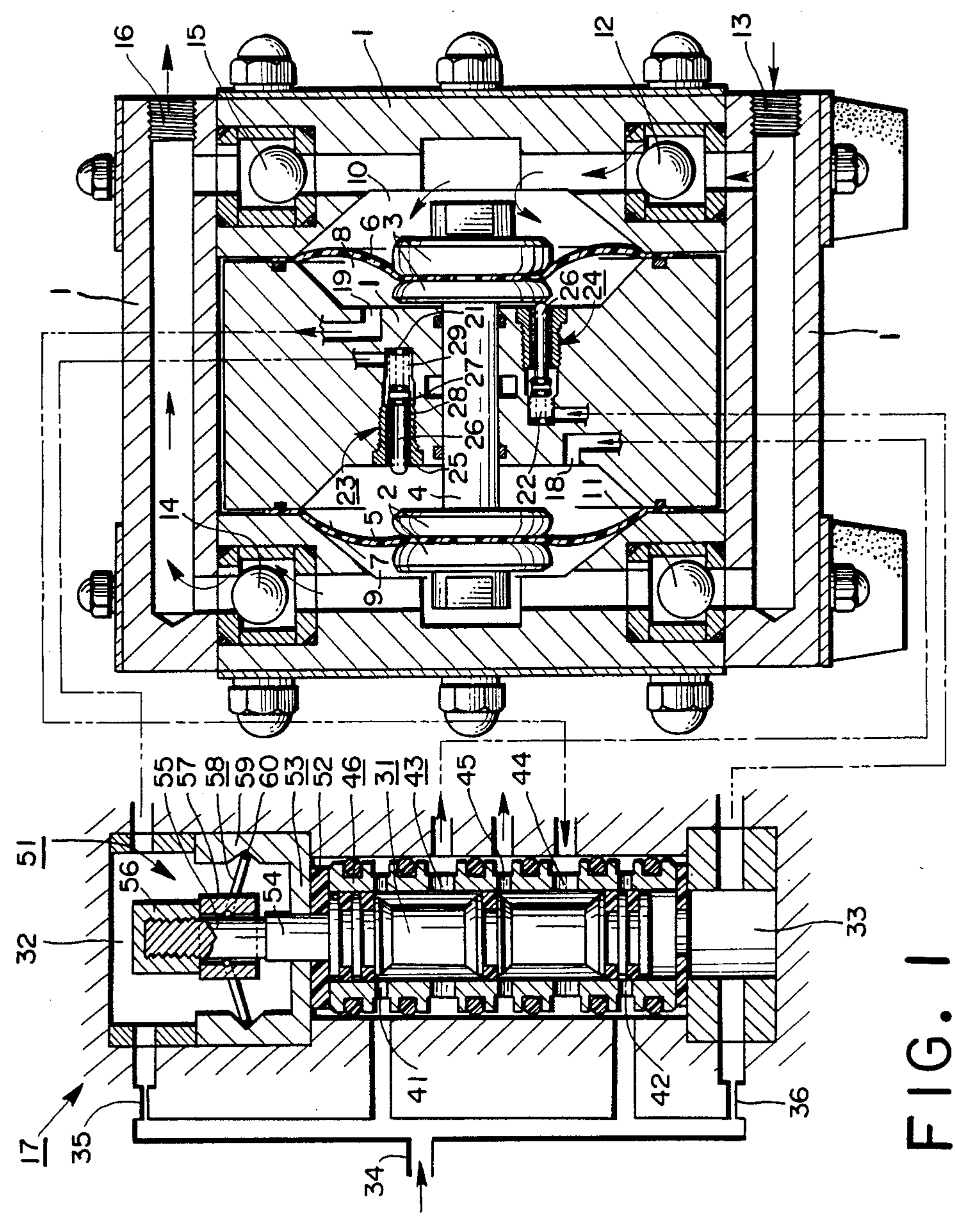
FIG. 1 is a schematic section view of a spool type switching valve device according to the present invention.

The illustration of the preferred embodiment of the present invention will be described herein referring to the attached drawings;

As shown in FIG. 1, rims of diaphragms 5 and 6, the centers of which are sandwiched between and held by center disks 2 and 3 respectively and are connected with each other by center rod 4, are thus fixed at both sides of pump body 1; and working fluid chambers 7 and 8 inside are separated from pump chambers 9 and 10 by said diaphragms 5 and 6.

Pump chambers 9 and 10 are connected with suction port 13 through check valves for suction 11 and 12 respectively and discharge port 16 through discharge check valves 14 and 15 respectively. Working fluid vents 18 and 19 are provided to said working fluid chambers 7 and 8 respectively in order to alternately supply and discharge working fluid into and from those chambers by means of a switching valve 17. Air serves as the working fluid referred to herein. Switching valve 17 is inset in the center of pump body 1 in an actual device, but it is shown outside the device in the drawing in order to facilitate explanation.

Further, switching pressure reduction holes 21 and 22 are provided to said working fluid chambers 7 and 8 respectively; and said switching pressure reduction holes 21 and 22 are provided with switching valves 23 and 24 which open and close them in conjunction with the movement of diaphragm 5 and 6 immediately before the termination of working fluid exhaust. Switching valves 23 and 24 are configured with valve bodies 25 screwed in said pressure reduction holes 21 and 22. Push rods 26 are inserted into said valve bodies 25 so as to be movable therein. O rings 27 are fitted around small diameter sections at the rear part of said push rods 26 and facing valve seats 28. Compressed coil springs 29 are fitted between the rear ends of push rods 26 and the surface of the pump body facing these rear ends in order to project the front ends of push rods 26 into working fluid chambers 7 and 8. Switching valve 17 is configured by providing at the both ends of spool 31 switching compression spaces 32 and 33 which lead to said switching pressure reduction holes 21 and 22 respectively, and connecting, through orifices 35 and 36 respectively, these switching compression spaces 32 and 33 to working fluid intake port 34 for supplying working fluid to switching valve 17.

Switching valve 17 is provided with ports 41 and 42, which directly lead to said working fluid intake port 34. Ports 43 and 44 leading directly to said working fluid vents 18 and 19 of pump body 1. Port 45 exhausts the air serving as the working fluid to the outside atmosphere. Further, all of said ports are provided at sleeve 46, which is fitted around spool 31.

The operation of the present embodiment shown in FIG. 1 is as follows;

Air is supplied from working fluid intake port 34 into switching valve 17 at a specified pressure.

At that moment, spool 31 is in a position where port 41 is open and port 42 is closed, and thus the air goes through port 41 and enters port 43 and further enters into working fluid chamber 7 in pump body 1.

At the same time the air in working fluid chamber 8 is discharged from vent 19, goes through port 44, and then is exhausted from port 45 to the outside atmosphere.

Therefore, diaphragms 5 and 6 and center rod 4 move to the left; diaphragm 5 pushes fluid material in pump chamber 9 at the left side to discharge port 16. Simultaneously, diaphragm 6 sucks fluid material from suction port 13 into pump chamber 10 at the right side.

Immediately before the termination of this leftward movement, the end of center disk 3 pushes push rod 26 of switch valve 24 so that the air in switching compression space 33 is exhausted into the atmosphere through said switch valve 24, working fluid chamber 8, vent 19 and port 44 and 45 respectively.

As the amount of air exhausted from switch valve 24 is larger than that supplied from orifice 36, the pressure upon switching compression spaces 32 and 33 at the both ends of spool 31, which was originally identical, becomes imbalanced, and the pressure applied to switching compression space 33 is reduced.

As a result, spool 31 moves toward switching compression space 33, and thus port 41 is closed and port 42 opened so that diaphragms 5 and 6 and center rod 4 move to the right.

Immediately before the termination of this rightward movement, the switching of working fluid is done automatically in the same manner as described above, and pumping action thus is continuously repeated.

Next, an explanation of the operation of detent mechanism 51 provided at one end of said switching valve 17 is given hereunder. The objective of this detent mechanism 51 is to prevent spool 31 from coming to a standstill at the neutral point.

As shown in FIG. 1, detent mechanism 51 comprises spring holder 53 fixed at one end of sleeve 46, with packing 52 in between; shaft 54, which is integrally affixed to spool 31, projects into said switching compression space 32 through said packing 52 and the center hole of spring holder 53. A cap nut 56 is screwed on shaft 55, which is a little smaller than shaft 54. A spool operator 57 is fitted around said small diameter of shaft 55 with a slight clearance provided in the direction of the shaft so as to be movable along the shaft 55. Wire springs 58 with a circular cross section are symmetrically fitted at the right and left sides of said spool operator 57. The other sides of wire springs 58 are fitted in single-V grooves 60 formed in ridges 59, which are integrally provided at right and left side of said spring holder 53.

Figure 2:
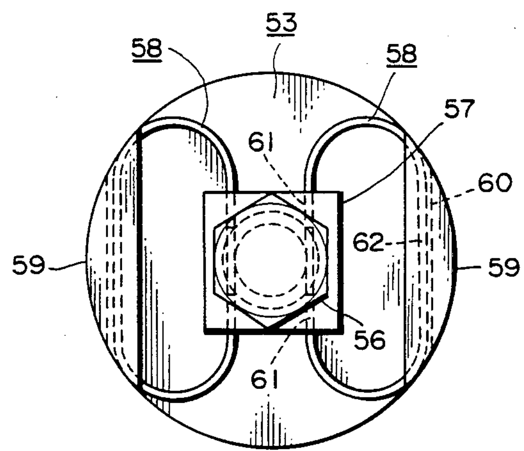
FIG. 2 is a schematic plan of a detent mechanism of same.

As shown in FIG. 2, each of said wire springs 58 is made into a C-shape, and both of its ends 61, facing each other with the gap in between, are fitted into small holes on said spool operator 57 so as to be rotatable therein. Further, straight portion 62 of each wire spring 58 is fitted in said single-V groove 60 so as to be rotatable therein.

Figures 3A, 3B, 3C, 3D:
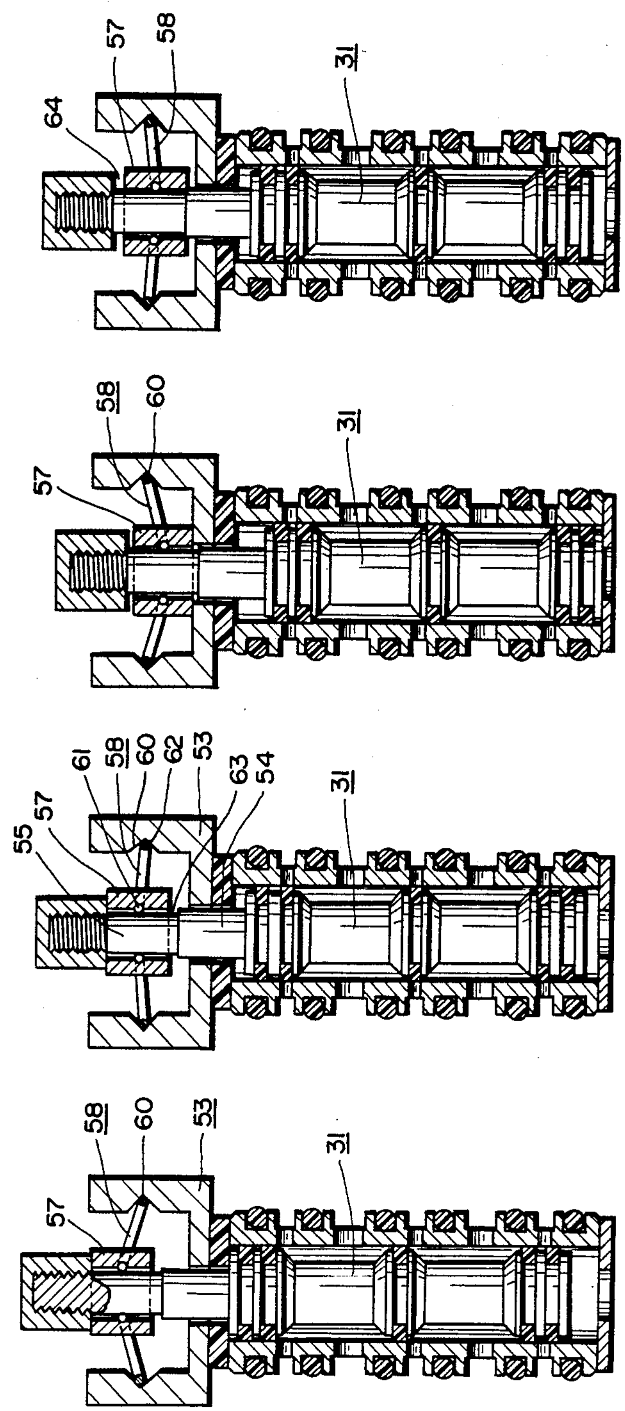
FIGS. 3A–3D are schematic sections view of said detent mechanism showing its action.

As shown in FIG. 3A, when spool 31 is moved downward from the upper switched position, wire springs 58 are rotated downward with single-V groove 60 on spring holder 53 as the fulcrum and compressed. As shown in FIG. 3B, as spool 31 approaches the neutral point, resisting wire spring 58, wire spring 58 are elastically deformed, as shown in FIG. 3B, with their ends 61 approaching respective alignment with straight portions 62, and thus conserves restoring force. Referring to FIG. 3C, when spool 31 has passed the neutral point, wire springs 58 are immediately rotated downward with a snap action with single-V grooves 60 as respective fulcrums with a snap action caused by the repellent force conserved in the wire springs. Thus, spool 31 is instantaneously switched to the lowest position. During said switching from position shown in FIG. 3B to position shown in FIG. 3C, because clearance 63 exists a the lower side of spool operator 57 fitted around shaft 55 before the switching, reversing spool operator 57 requires only a light spring force to pass the neutral point at first. Thereafter, the inertia force is applied upon the end surface of shaft 54 together with the pushing pressure of wire springs 58 to ensure switching of spool 31. FIG. 3D shows spool 31 moving upward, at a point where clearance 64 exists at the upper side of spool operator 57.

INDUSTRIAL APPLICABILITY

The present invention is effective as a spool type switching valve to be used for an operation switching mechanism for a diaphragm pump and other similar apparatuses, wherein a detent mechanism is provided at an end of a spool used for operation switching of a diaphragm pump in order to prevent the spool from coming to a standstill at the neutral point.

What is claimed is:

1. A spool type switching valve comprising: a spool inside a sleeve; means for permitting said spool to move in an axial direction in said sleeve; a detent mechanism at an end of said spool; said detent mechanism including a spool operator on a shaft section of said spool; a spring holder in said sleeve; said spring holder surrounding said spool operator; at least first and second C-shaped wire springs with a circular cross section fitted between said spool operator and said spring holder; at least first and second straight grooves in said spring holder; a straight portion on each of said at least first and second C-shaped wire springs; said straight portion fitting into it respective straight groove; first and second end portions on each of said C-shaped wire springs; said first and second end portions being substantially straight and generally parallel to their respective straight portion; and means in said spool operator for permitting rotatable engagement with said first and second end portions of said at least first and second C-shaped springs.

2. A spool type switching valve according to claim 1, further comprising: means for permitting said spool operator to move a limited clearance distance axially along said shaft section; and said limited clearance distance being effective for permitting said spool operator to begin axial movement before said shaft begins axial movement, whereby an inertia of said spool operator aids in moving said shaft from a neutral standstill position.

3. A spool type switching valve comprising:

a sleeve;

a spool;

said spool being disposed inside said sleeve;

means for permitting axial motion of said spool in said sleeve;

a detent mechanism;

a spool operator;

at least first and second holes horizontally bored in said spool operator;

a shaft section on said spool;

said spool operator being fitted on said shaft section;

a spring holder affixed to said sleeve;

said spring holder having at least first and second straight grooves;

at least first and second C-shaped wire springs, wherein said wire has a circular cross-section;

at least first and second C-shaped springs being fitted between symmetrically fitted between said spool operator and said spring holder;

each of said at least first and second springs includes a straight central portion and two curved end portions curved towards each other in circular arcs and ending in two straight portions parallel to said central portion;

said straight portions of said C-shaped spring are fitted in said holes in said spool operator so as to be capable of rotating in said at least two holes; and said straight central portions are fitted in said straight grooves in said spring holder so as to be able to rotate in said grooves.

4. The spool switching valve according to claim 3, wherein:

said shaft section includes an axial clearance with said spool operator;

said spool operator being free to move axially on said shaft section; and said axial clearance permitting said spool operator to begin axial motion along said shaft section before said spool moves.

* * * * *